United States Patent [19]
Forslund et al.

[11] Patent Number: 6,139,606
[45] Date of Patent: Oct. 31, 2000

[54] METHOD AND APPARATUS FOR PUMPING A MEDIUM

[75] Inventors: Kjell Forslund, Sundsbruk; Leo Kotkaniemi, No 1, both of Sweden

[73] Assignee: Valmet Fibertech Aktiebolag, Sweden

[21] Appl. No.: 09/155,120

[22] PCT Filed: Mar. 7, 1997

[86] PCT No.: PCT/SE97/00393

§ 371 Date: Sep. 22, 1998

§ 102(e) Date: Sep. 22, 1998

[87] PCT Pub. No.: WO97/36044

PCT Pub. Date: Oct. 2, 1997

[30] Foreign Application Priority Data

Mar. 27, 1996 [SE] Sweden ................... 9601213

[51] Int. Cl.$^7$ .................................................. B01D 19/00
[52] U.S. Cl. ..................... 95/241; 95/243; 95/248; 95/260; 96/195; 96/196; 96/204
[58] Field of Search ............... 95/248, 241, 243, 95/260, 261, 266; 96/159, 165, 168, 193, 194, 195, 196, 198, 204; 162/55

[56] References Cited

U.S. PATENT DOCUMENTS

| | | | |
|---|---|---|---|
| 3,481,113 | 12/1969 | Burnham, Jr. | 95/248 |
| 3,517,487 | 6/1970 | Burnham, Jr. | 96/159 |
| 3,616,599 | 11/1971 | Burnham, Jr. | 96/198 |
| 3,769,779 | 11/1973 | Liljestrand | 96/196 |
| 3,898,061 | 8/1975 | Brunato | 96/198 |
| 4,097,249 | 6/1978 | Phillips et al. | 95/248 |
| 4,097,253 | 6/1978 | Phillips et al. | 96/198 |
| 4,108,619 | 8/1978 | Phillips et al. | 96/196 |
| 4,410,337 | 10/1983 | Gullichsen et al. | 95/261 |
| 4,435,193 | 3/1984 | Gullichsen et al. | 95/261 |
| 4,516,987 | 5/1985 | Niggemann . | |
| 4,645,518 | 2/1987 | Roffelsen . | |

FOREIGN PATENT DOCUMENTS

| | | |
|---|---|---|
| 1277543 | 12/1990 | Canada . |
| 95/02768 | 1/1995 | WIPO . |

*Primary Examiner*—David A. Simmons
*Assistant Examiner*—Minh-Chau T. Pham
*Attorney, Agent, or Firm*—Lerner, David, Littenberg, Krumholz & Mentlik, LLP

[57] ABSTRACT

Methods and apparatus are disclosed for degassing gas-containing fluid media in a container with the apparatus including a centrifugal pump for pumping the gas-containing fluid medium from the container, an ejector including a suction side, an ejector inlet for a drive fluid, and an ejector outlet for the drive fluid, whereby at least a portion of the pump fluid medium is fed to the suction side of the ejector for removing the gas therefrom, a diversion conduit for diverting a separate portion of the pump fluid medium from the centrifugal pump to the ejector inlet, and a return conduit for returning the separate portion of the fluid medium from the ejector outlet to the container.

7 Claims, 3 Drawing Sheets

METHOD AND APPARATUS FOR PUMPING A MEDIUM

FIELD OF THE INVENTION

The present invention relates to the pumping a fluid medium, such as a liquid or suspension, containing a gas. More particularly, the present invention relates to a method and apparatus for removing the gas from the medium in a pump.

BACKGROUND OF THE INVENTION

When pumping a gas-containing medium, such as a pulp suspension containing air or another gas, by means of centrifugal pumps, the pumping process is rendered more difficult by the gas being collected centrally in the pump in front of the impeller. A gas bubble formed in that manner thus increases in size until the pump ceases to operate.

In order to eliminate this problem, centrifugal pumps have been designed with impellers, which are provided with openings for evacuating the gas flow from the central portion of the pump and further through evacuation channels out of the pump. According to known techniques, vacuum pumps are generally used for evacuating the gas. The gas to be evacuated is therefore required to be practically free of impurities so as to limit the wear on the vacuum pumps.

Particularly during the pumping of pulp suspensions problems arise by the pulp following along with the gas. This applies particularly to the pumping of pulp at low concentrations. The pulp concentration is normally in the range of from 1 to 20%. A further problem is that the pulp suspension flowing through in this manner cannot be pumped back to the container, to which the pulp pump is connected. Furthermore, normal vacuum pumps cannot manage high temperatures.

One object of the present invention is therefore to solve the aforementioned problems by using an ejector for evacuating the gas from the medium in the pump.

SUMMARY OF THE INVENTION

In accordance with the present invention, this and other objects have now been realized by the discovery of a method for degassing a gas-containing fluid medium in a container which comprises pumping the fluid medium from the container to provide a pumped fluid medium, passing at least a portion of the pumped fluid medium through the suction side of an ejector for removing the gas from the fluid medium, diverting a separate portion of the pumped fluid medium to drive the ejector, and returning the separate portion of the pumped fluid medium exiting from the ejector to the container. Preferably, the pump comprises a centrifugal pump. More preferably, the fluid medium comprises a liquor from a pulp manufacturing process. In a preferred embodiment, the method includes further processing of the liquor in a pulp manufacturing process.

In accordance with the present invention, apparatus has also been discovered for degassing a gas-containing fluid medium comprising a container for the gas-containing fluid medium, a centrifugal pump for pumping the gas-containing fluid medium from the container, an ejector including a suction side, an ejector inlet for a drive fluid, and an ejector outlet for the drive fluid, whereby at least a portion of the pumped fluid medium is fed to the suction side of the ejector for removing the gas therefrom, a diversion conduit for diverting a separate portion of the pumped fluid medium from the centrifugal pump to the ejector inlet, and a return conduit for returning the separate portion of the fluid medium from the ejector outlet to the container.

In accordance with a preferred embodiment of the apparatus of the present invention, the container includes a degassing valve for eliminating gas from the fluid medium returned to the container.

In accordance with another embodiment of the apparatus of the present invention, the centrifugal pump is located downstream of the container, and the apparatus includes a glass gauge for filtrate from a press located between the container and the centrifugal pump.

In accordance with the present invention, by diverting a partial flow of the pumped medium after the pump, i.e. in the pressure line of the pump, and causing this partial flow to drive an ejector, the suction side of which is coupled to the evacuation channels of the pump, the gas can effectively be removed from the medium in the pump. This partial flow can then be recycled to the container from which the medium is pumped.

The gas-containing medium can consist, for example, of pulp suspensions or liquor from the pulp manufacturing process. Liquor pumps are employed in digester houses, screen rooms, washer rooms, bleach plants, and the like.

BRIEF DESCRIPTION OF THE DRAWINGS

The present invention may be more fully appreciated with reference to the following detailed description, which, in turn, refers to the drawings, in which.

DETAILED DESCRIPTION

Figure 2:
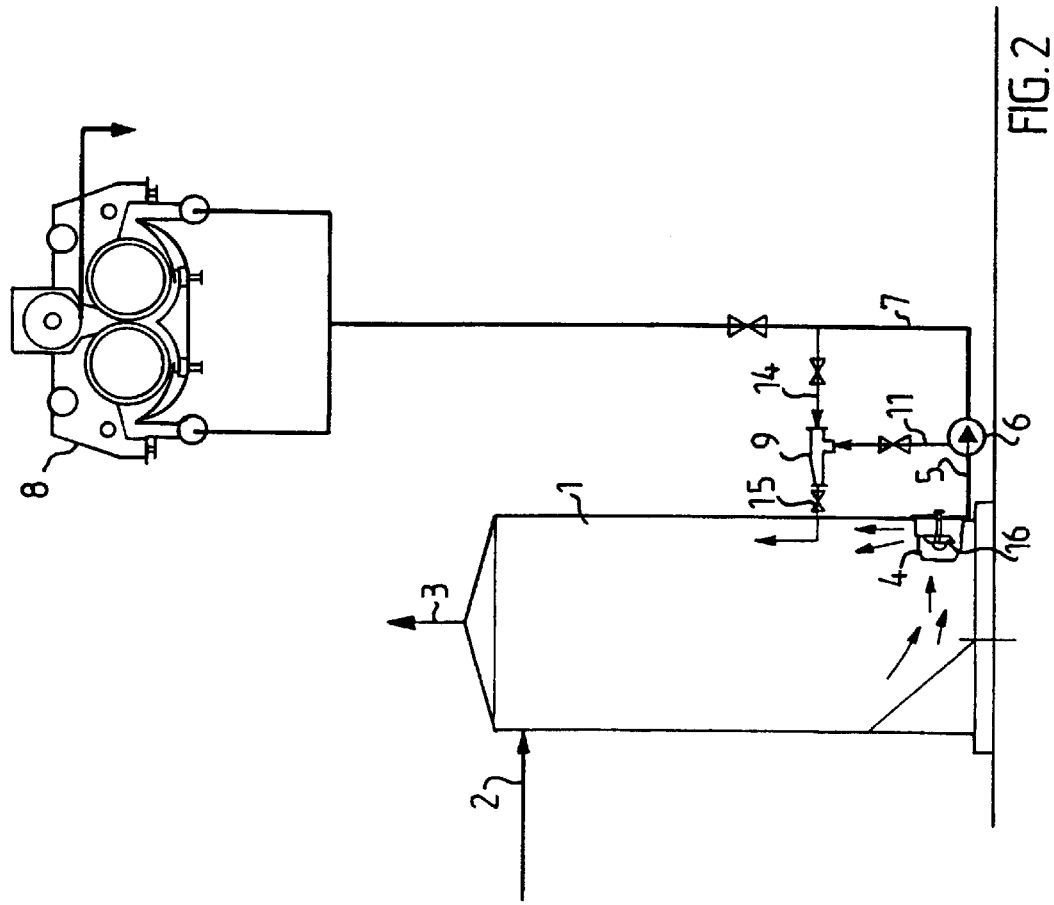
FIG. 2 is a schematic representation of a system for degassing pulp suspensions in accordance with another embodiment of the present invention.

Referring to the embodiments of the present invention shown in FIGS. 1–4, a chest 1 is provided for a pulp suspension. The pulp is supplied to the chest through a feed line 2. At the top of the chest 1 a degassing valve 3 is located. The chest further comprises an agitator 4. An outlet line 5 for the pulp is connected to the lower portion of the chest 1. The pulp is pumped by a centrifugal pump 6 from the chest through the outlet line 5 and further through the pressure line 7 of the pump to subsequent processing stages, which in this case consist of a press 8 for dewatering in combination with washing. An ejector 9 is coupled with its suction side 10 to the pump 6 by means of a suction line 11. The ejector effect is obtained in a known manner such that a drive medium passes through the ejector from an inlet 12 to an outlet 13.

Figure 1:
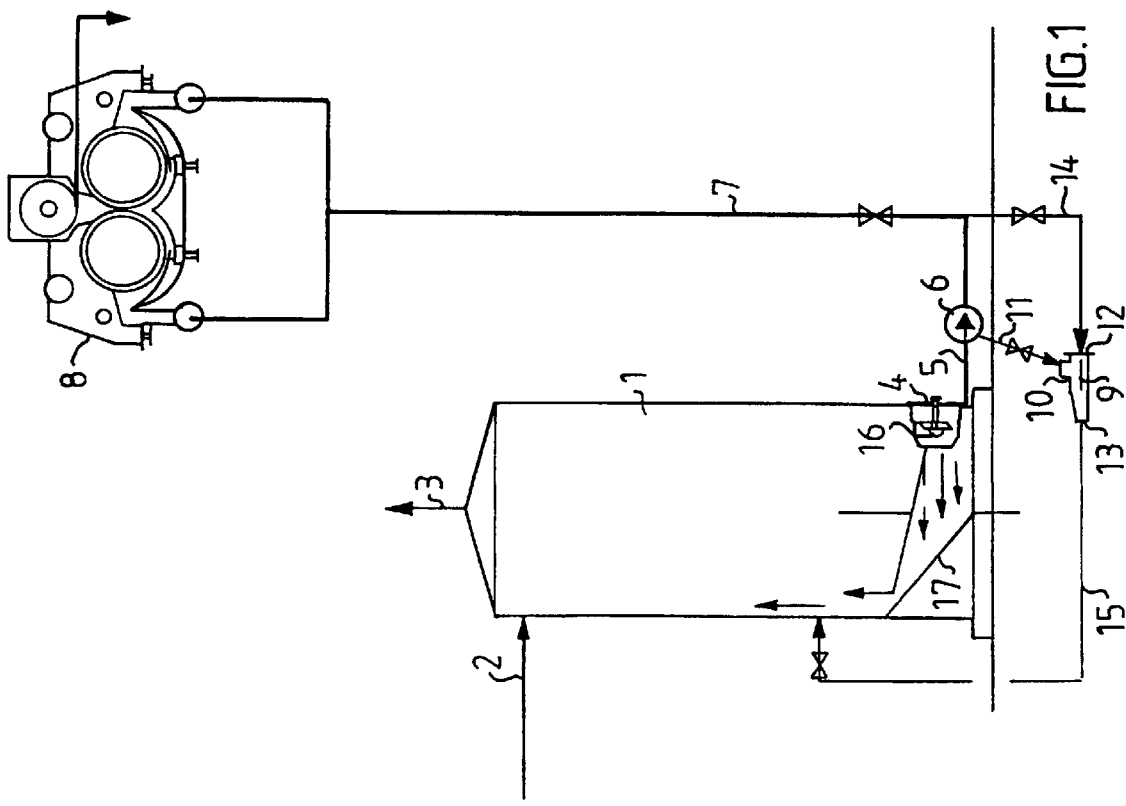
FIG. 1 is a schematic representation of a system for degassing pulp suspensions in accordance with one embodiment of the present invention.

According to FIG. 1, a branch line 14 is provided from the pressure line 7 to the inlet 12 of the ejector 9, and a return line 15 is provided from the outlet 13 of the ejector back to the chest 1. The return line 15 is connected to the chest 1 directly in front of the outlet line 5 and agitator 4. The agitator 4 is formed with a propeller 16, which effects a flow along the opposed wall, which is provided with an inclined portion 17. In this manner, the ejector 9 is driven by a partial flow of the medium, so that this partial flow through the suction line 11 sucks with it gas from the pump 6. The gas-enriched partial flow is returned to a portion of the chest 1 where the pulp flows upward due to the effect of the agitator. At the top of the chest a substantial portion of the gas is evacuated through the valve 3.

According to the embodiment shown in FIG. 2, the return line 15 from the ejector 9 is connected to the chest 1 above outlet line 5 and agitator 4. In this case the rotation direction of the propeller 16 of the agitator 4 is reversed, so that the upward flowing pulp flow in the chest passes the connection of return line 15. According to this embodiment, the location of this line is more advantageous, because the ejector 9 is located directly above the pump 6 and agitator 4.

Figure 3:
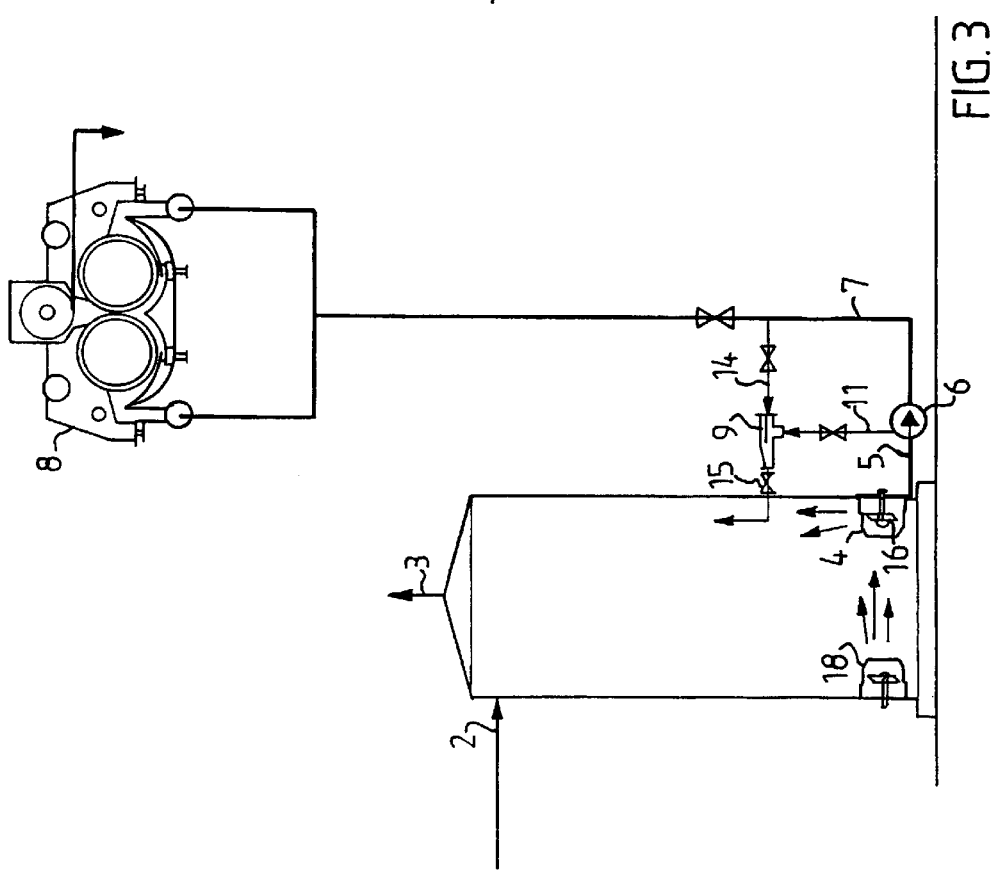
FIG. 3 is a schematic representation of systems for degassing pulp suspensions in accordance with another embodiment of the present invention.

According to the embodiment shown in FIG. 3, the chest 1 is provided with an extra agitator 18, which can be necessary with large chests. In other respects, this arrangement corresponds to the embodiment shown in FIG. 2.

At high pulp temperatures it may be necessary to partially or entirely replace the partial flow of the pulp suspension by another liquid having a lower temperature, preferably a liquor used for diluting the pulp.

Figure 4:
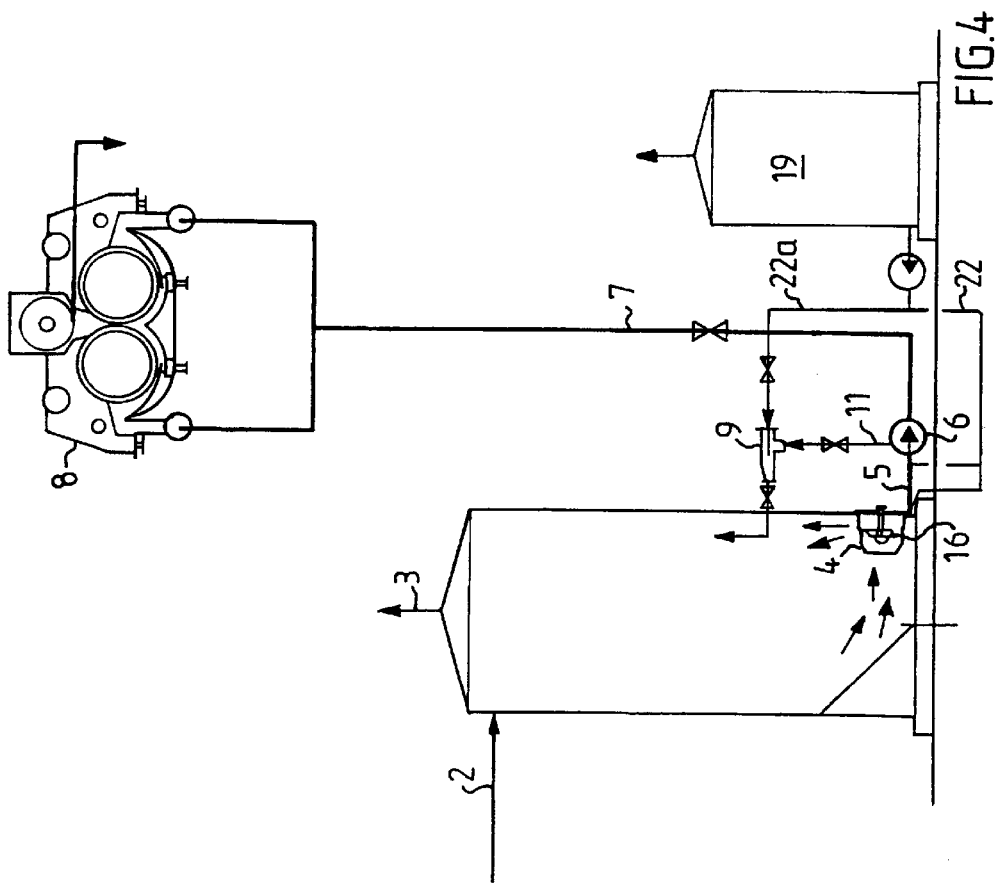
FIG. 4 is a schematic representation of systems for degassing pulp suspensions in accordance with another embodiment of the present invention.

According to the embodiment shown in FIG. 4, a container 19 for liquor is used for diluting the pulp. The liquor is pumped by a pump 40 through a line 22 to the chest 1 at the location of agitator 4, and to the outlet line 5. In this case the ejector 9 is driven by a partial flow of liquor from a branch line 22*a* from the dilution liquor line 22. In other respects, the arrangement corresponds to the embodiment shown in FIG. 2.

Figure 5:
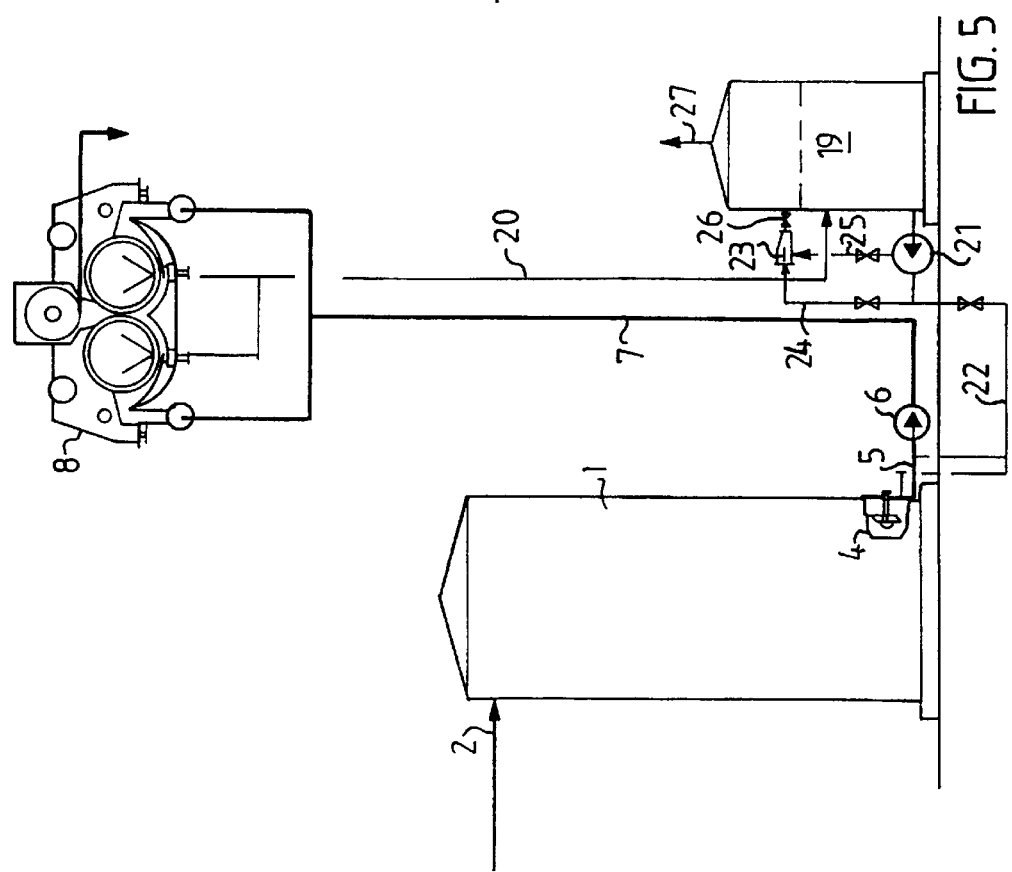
FIG. 5 is a schematic representation of systems for degassing liquor in accordance with another embodiment of the present invention.

According to the embodiment shown in FIG. 5, a container 19 with liquor is used for diluting the pulp. The liquor arrives through a line 20 from the press 8 where the liquor is pressed out of the pulp. The liquor used for diluting the pulp is pumped by a degassable centrifugal pump 21. Dilution liquor is directed through a line 22 to the chest 1 at the location of agitator 4 to the outlet line 5. In this case an ejector 23 is driven by a partial flow of liquor from a branch line 24 from the dilution liquor line 22. Degassing of the liquor in the pump 21 takes place by the ejection by means of a suction line 25. A return line 26 for the partial liquor flow through the ejector is connected to the liquor container 19 above the maximum liquor level. The liquor container is provided at its top with a degassing valve 27.

Figure 6:
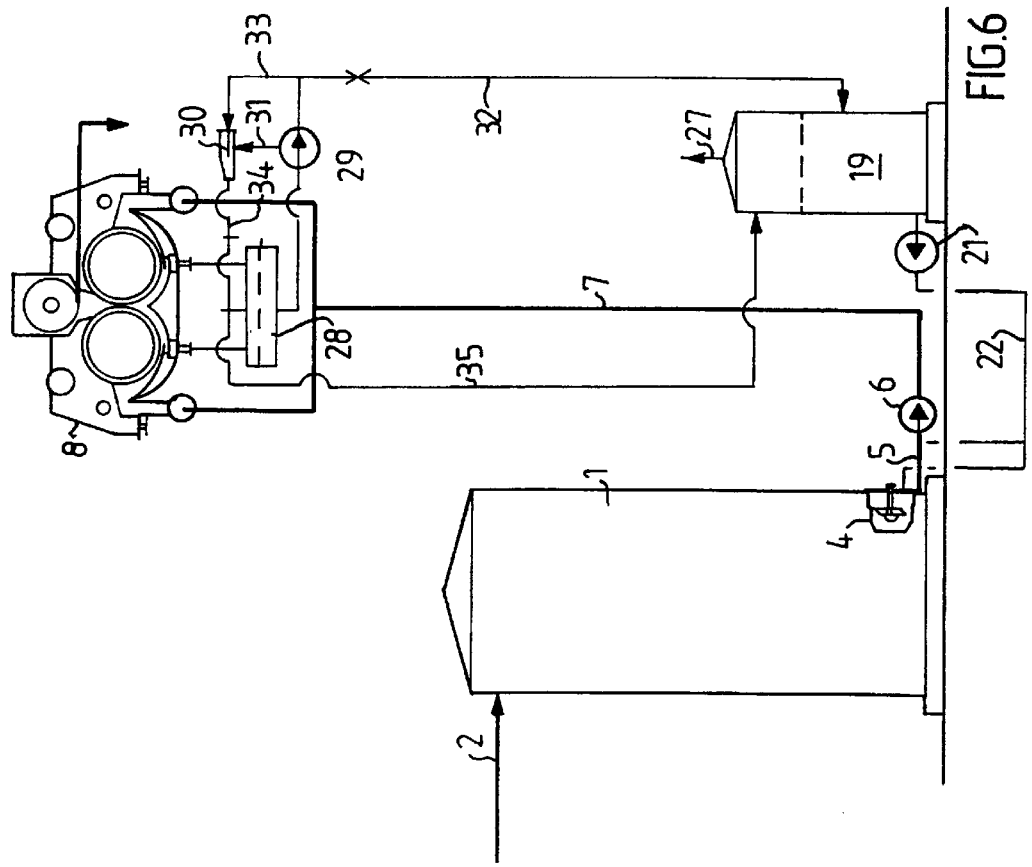
FIG. 6 is a schematic representation of systems for degassing liquor in accordance with another embodiment of the present invention.

According to the embodiment shown in FIG. 6, a glass gauge 28 for filtrate from the washing press 8 is located below the press. A degassable liquor pump 29 can be connected to the glass gauge 28 with an accessory ejector 30 for degassing through a suction line 31. The liquor pump 29 pumps the liquor through a line 32 to the liquor container 19. This implies that necessary filtrate flow from the press 8 can be obtained without any great difference in level.

In this case, the ejector 30 is driven by a partial flow of the liquor through a branch line 33 from the line 32. A return line 34 for the partial flow through the ejector 30 is connected to a line 35 for degassing the glass gauge 28. This line 35 is connected to the liquor container 19 above the maximum liquor level. This arrangement further implies that he size of the liquor container 19 can be reduced substantially.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for degassing a gas-containing fluid medium in a container comprising pumping said fluid medium from said container with a pump to provide a pumped fluid medium, diverting a separate portion of said pumped fluid medium to drive an ejector, removing said gas from said pump by passing at least a portion of said plumped fluid medium through a suction side of said ejector, and returning said separate portion of said pumped fluid medium exiting from said ejector to said container.

2. The method of claim 1 wherein said pump comprises a centrifugal pump.

3. The method of claim 1 wherein said fluid medium comprises a liquor from a pulp manufacturing process.

4. The method of claim 3 including further processing said liquor in a pulp manufacturing process.

5. Apparatus for degassing a gas-containing fluid medium comprising a container for said gas-containing fluid medium, a centrifugal pump for pumping said gas-containing fluid medium from said container, an ejector including a suction side connected to said centrifugal pump, an ejector inlet for a drive fluid, and an ejector outlet for said drive fluid, whereby at least a portion of said pumped fluid medium is fed to said suction side of said ejector for removing said gas from said centrifugal pump through said suction side of said ejector, a diversion conduit for diverting a separate portion of said pumped fluid medium to said ejector inlet, and a return conduit for returning said separate portion of said fluid medium from said ejector outlet to said container.

6. The apparatus of claim 5 wherein said container includes a degassing valve for eliminating gas from said fluid medium returned to said container.

7. The apparatus of claim 5 wherein said centrifugal pump is located downstream of said container, and including a glass gauge for filtrate from a press located between said container and said centrifugal pump.

* * * * *

UNITED STATES PATENT AND TRADEMARK OFFICE
CERTIFICATE OF CORRECTION

PATENT NO.   :   6,139,606
DATED        :   October 31, 2000
INVENTOR(S)  :   Kjell Forslund *et al.*

It is certified that error appears in the above-identified patent and that said Letters Patent is hereby corrected as shown below:

Cover page, at [75], second line, cancel "No l" and insert --Nol--.

Signed and Sealed this

Twenty-second Day of May, 2001

Attest:

NICHOLAS P. GODICI

*Attesting Officer*    *Acting Director of the United States Patent and Trademark Office*